March 30, 1926.

B. D. GILSON 1,578,281

COLLISION SHOCK ABSORBER

Filed Feb. 21, 1925 2 Sheets-Sheet 1

March 30, 1926.

B. D. GILSON

COLLISION SHOCK ABSORBER

Filed Feb. 21, 1925     2 Sheets-Sheet 2

1,578,281

Witnesses:
William P. Kilroy
Harry L. White

Inventor:
Bert D. Gilson
By Oliver O. Martin Atty.

Patented Mar. 30, 1926.

1,578,281

UNITED STATES PATENT OFFICE.

BERT D. GILSON, OF CHICAGO, ILLINOIS.

COLLISION SHOCK ABSORBER.

Application filed February 21, 1925. Serial No. 10,760.

*To all whom it may concern:*

Be it known that I, BERT D. GILSON, a citizen of the United States, residing at Chicago, in the county of Cook and State of Illinois, have invented new and useful Improvements in Collision Shock Absorbers, of which the following is a specification.

This invention has relation to self propelled vehicles, and refers particularly to collision shock absorbers for such vehicles. Such shock absorbers usually are termed bumpers, and they are attached to the front and rear ends of the vehicle chassis.

The bumpers provided in the early days of the automobile history consisted merely of a rigid bar transversely mounted on chassis front and rear ends. Later the mounting devices for such bars were made resilient, and at the present time, it is customary to employ also flexible bumper bars, in order to attain greater shock absorbing efficiency.

The object of the present invention is the provision of a bumper of great resiliency. A further object is to provide a bumper which may readily absorb, not only direct thrusts, but also diagonal shocks. More particularly my invention consists in the improved features of construction hereinafter fully described and illustrated in the accompanying drawings, of which:

Figure 1:
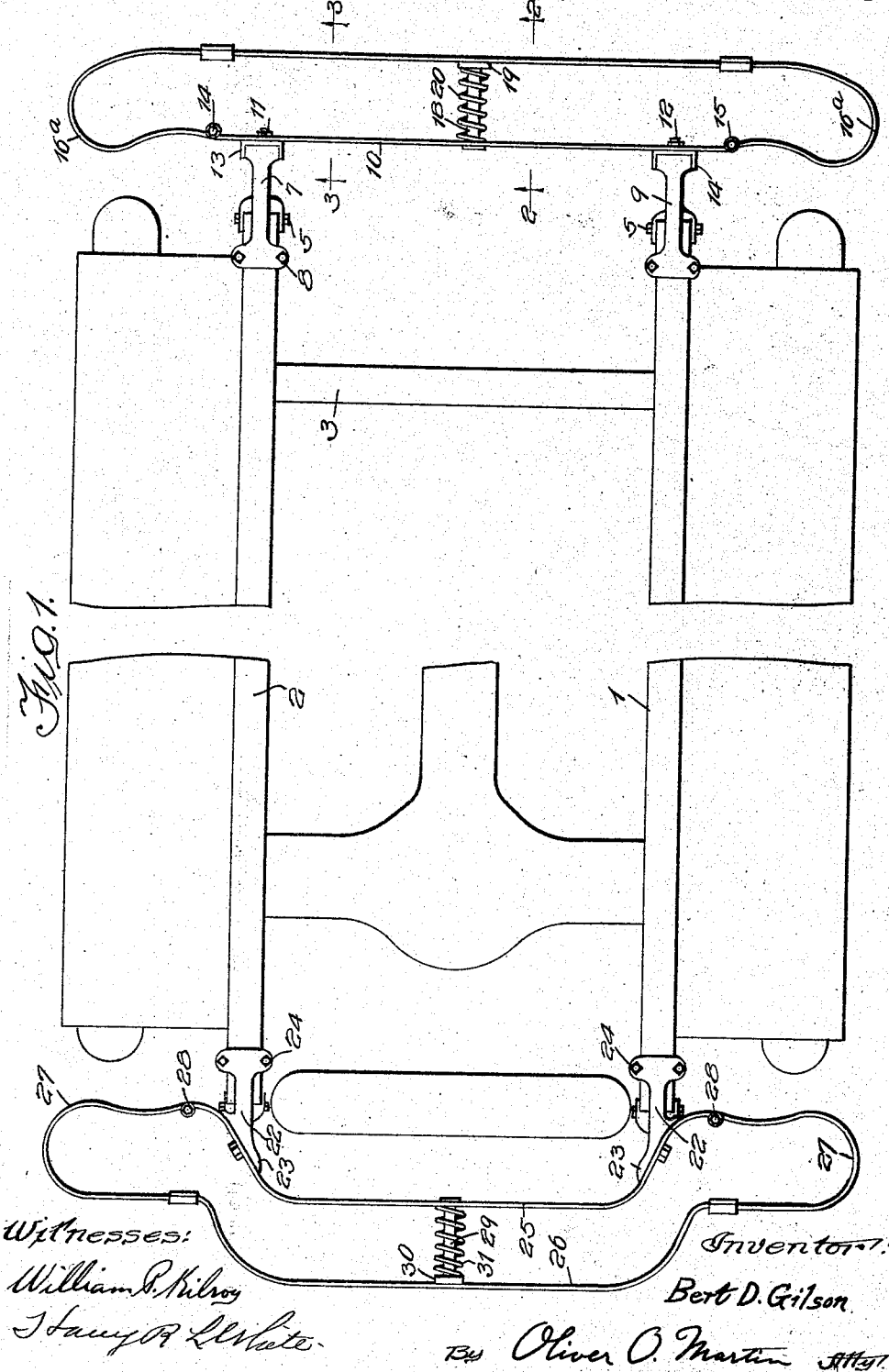
Fig. 1 is a plan view of an automobile chassis embodying the invention.
Figure 2:
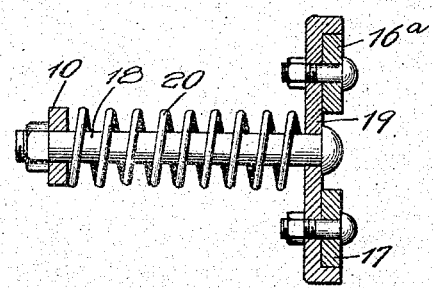
Fig. 2 shows the front end of the left spring bracket and wheel spring, with the bumper of my invention attached, the latter being shown in section, substantially on line 2 of Fig. 1.
Figure 3:
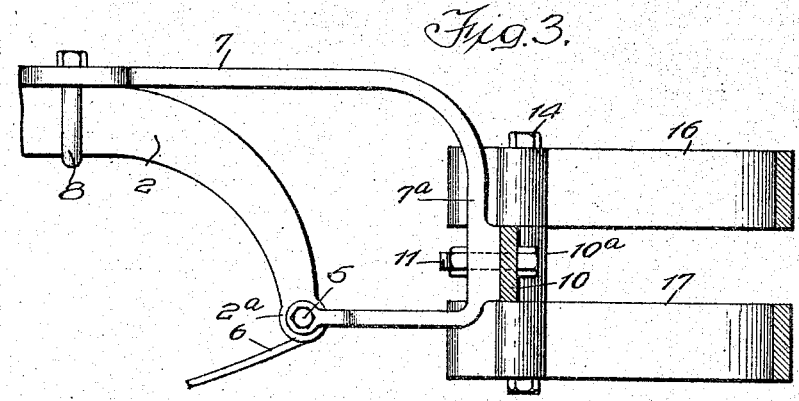
Fig. 3 is a fragmentary view, similar to Fig. 2, but taken substantially on a line 3 of Fig. 1.

The chassis may be of any ordinary construction, and it comprises a pair of parallel frame bars 1 and 2, suitably combined, as by cross braces 3, 4. A front bumper and a rear bumper are attached to these bars, as will now be described. The chassis bar 2 terminates at the front in a perforated head 2ª shaped to receive a shackle bolt 5, by means of which the usual vehicle wheel spring 6 is operatively combined with said bar. A bracket 7 is perforated to receive a U-bolt 8, by means of which it is rigidly clamped in place on the bar 2. This bracket extends forward and is then bent downward at 7ª and rearward. It terminates in a perforated head, shaped to straddle the head of the bar 2 and to receive the shackle bolt 5. In this, or any other suitable manner the bracket 7 is rigidly mounted on the end of the chassis bar 2, and it is to be noted that the bracket head abuts the front face of the chassis bar head 2ª, which is quite important in order that the bracket may be able to resist the blows it is subjected to without sliding longitudinally on the chassis bar.

To the right frame bar 1 is rigidly attached a second bumper bracket 9, which preferably is identical with the bracket 7. An inner bumper cross bar 10 is fastened to the pendant portion of the two brackets in any suitable manner, as by a pair of bolts 11, 12, and a pair of clips 13, 14 may conveniently be made to straddle said brackets in order to afford a better anchoring surface for the said cross bar. The cross bar 10 is at both ends curled up to form heads 10ª, of a size to receive a pair of hinge bolts, 14, 15, and the latter in turn support a pair of outer bumper cross bars 16, 17. The ends of the latter bars are similarly curled up to fit the said bolts, as clearly indicated in the drawing. The inner cross bar 10 is perforated in the center to receive a bolt 18, and this bolt is securely anchored in a vertically disposed brace 19, which brace serves to combine the two outer bumper bars 16, 17 and to maintain them permanently in properly spaced parallel relation. A powerful coil spring 20 is hung on this bolt, and it is long enough to occupy the space between the brace 19 and the inner bumper bar, 10, as indicated. All the three aforenamed bumper bars are made of resilient metal, such as steel, and it is to be noted that the outer bars 16, 17 terminate at both ends in wide sweeping curves 16ª, which extend well back of the hinge bolts 14, 15, occupying substantially three-fourths of a circle.

On account of the powerful support afforded by the spring 20, bearing against the inner bar, 10, it is to be noted, that the bumper bars may be much lighter and consequently much more flexible than such bars ordinarily are made when used without such spring and inner support. When to this is added the large curved ends of the outer bars, it should be clear to those versed in the art that the outer corners of the bumpers are very sensitively compressible. Further-more, it must be noted that the bars are free to swing on the hinge pins 14, 15. The effect of a direct frontal impact, as when thrust against the bumper of a colliding vehicle, is to compress the spring 20, causing the bolt 18 to slide rearwardly through the perforation in the bar 10. The loops 16ª, 17ª simultaneously are urged rearwardly and may yield considerably because, due to freedom of motion on the hinge bolts 14, 15, the ends of the bars are able to wind themselves up on said bolts in response to such pressure. If the impact of collision is diagonally directed against one corner of the bumper, it is to be noted that the effect on the loop struck is to wind this loop up on its hinge pin, and that there is a simultaneous tendency to unwind on the part of the loop at the other end. The bolt 18 should be given sufficient freedom to move laterally in response to such impact.

The rear bumper should, preferably, be identical with the one described. Frequently it is found, however, desirable to allow room between the bumper and the rear of the vehicle for the spare tire usually carried by automobiles. The modification in the construction, necessary for this purpose, may be as illustrated in Fig. 1. It is here assumed that the rear end of the chassis is shaped substantially like the front end, and that therefore, similar brackets 22, clips 23 and U-bolts 24 may be used. The inner bumper bar 25, is curved rearwardly to provide a central loop, and the outer bumper bars 26 are given a corresponding rearward curve. Hinge pins 28, bolt 29, brace 30 and spring 31 may remain substantially as above described. The thrusts against the bumper bars will in this case be absorbed as readily as by the front bumper. The spring 31 supports the center of the bumper equally as well, and the outer loops 27 may flex and wind as freely on the hinge pins 28. It may be noted that the looped ends of the bumper as thus constructed afford protection to the wheel fenders.

Figure 4:
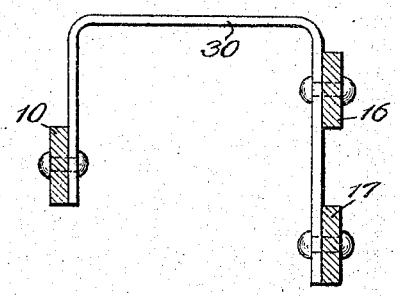
Fig. 4 illustrates a detail of construction, the importance of which will hereinafter be pointed out.

In place of the bumper brace 19, the bolt 18 and the buffer spring 20, it is possible to provide a single resilient U-shaped brace, 30, substantially as indicated in Fig. 4. This construction would be cheaper but, of course, not quite so sensitive.

Because there is no uniformity in the chassis construction of automobiles, and in the leaf spring suspension, it is evident that minor modifications in shape and construction may be necessary in order to attach my bumper to vehicles of various makes, but the essential features of my invention, as above set forth and hereinafter claimed should remain substantially unchanged.

I claim:

1. A vehicle bumper comprising a pair of brackets perforated at each end for attachment to the vehicle, clips on said brackets intermediate their ends, a cross bar clamped in said clips, said bar terminating adjacent to said clips in perforated heads, a flexible impact member formed with similar perforated heads at the ends, pivots seated in said perforations, said impact member comprising a straight portion extending in parallel spaced relation to and the full length of said bar, and continuing thence in large outward and rearward sweeping curves to said heads.

2. A vehicle bumper comprising a pair of support brackets, a cross bar on said brackets and terminating in perforated heads directly outside the brackets, a flexible impact member perforated at the ends, pivots seated in the ends of the bar and the member, said member provided with a straight portion from which it extends in large outward and rearward curves to said pivots, and means yieldingly maintaining the bar and the member in parallel spaced relation.

3. In a vehicle bumper, a support frame having perforated ends and fitted for attachment to the vehicle close to said perforations, a flexible impact member pivotally hung on said frame in parallel spaced relation thereto by means of pivots seated in said perforations, said member having a straight portion substantially as long as said frame, from which portion it extends in large outward and rearward curves to its pivots, a bolt extending through the center of the frame and the impact member so as to prevent spreading of said parts, and a coiled spring seated on the bolt between the said parts yieldingly to maintain them in such spaced relation.

4. In combination with a vehicle chassis having longitudinal frame bars, a pair of brackets, clamped against the ends of said bars, clips rigid on the outer ends of said brackets, a cross member bolted on said clips, a second cross member encompassing said first member and pivotally mounted thereon, and means yieldingly maintaining the two members in spaced relation, said means comprising a non-yielding spacer preventing spreading of the two cross members, and a yielding spring occupying the space between said members.

5. In combination with vehicle chassis side bars terminating in perforated heads, a pair of J-shaped brackets the short legs of which are bifurcated to straddle said heads and similarly perforated, shackle bolts seated in said perforations, the long legs of said brackets resting on top of said side bars, U-bolts engaging said legs to clamp them rigidly on said bars, clips on the bow of said J-brackets, a resilient cross member fastened in said clips, a second cross member pivoted on the first member, and means maintaining the members yieldingly spaced apart.

6. In combination with vehicle side frames terminating in perforated heads and having a pair of shackle bolts seated in said heads, a pair of bent brackets perforated at one end to seat said bolts and at the other end to receive bolts for clamping the brackets to said side frames, a cross bar rigidly mounted on said brackets, a pair of bumper bars pivotally hung on said cross bar in parallel spaced relation thereto and means yieldingly maintaining said bumper bars in such spaced relation on the said cross bar.

In testimony whereof I have hereunto affixed my signature.

BERT D. GILSON.